United States Patent [19]

Konishi

[11] Patent Number: 5,690,440

[45] Date of Patent: Nov. 25, 1997

[54] CONTROLLER FOR SERIAL PRINTER CARRIAGE

[75] Inventor: Shinji Konishi, Nagano, Japan

[73] Assignee: Seiko Epson Corporation, Tokyo, Japan

[21] Appl. No.: 502,462

[22] Filed: Jul. 14, 1995

[30] Foreign Application Priority Data

Jul. 15, 1994 [JP] Japan .................. HEI 6-164238

[51] Int. Cl.$^6$ .................................................. B41J 19/30
[52] U.S. Cl. ........................................ 400/279; 400/903
[58] Field of Search ........................ 400/54, 74, 279, 400/320, 322, 323, 719, 903

[56] References Cited

U.S. PATENT DOCUMENTS

| 4,678,979 | 7/1987 | Hori ........................................ 318/696 |
| 5,431,502 | 7/1995 | Orii ........................................ 400/322 |

OTHER PUBLICATIONS

Patent Abstracts of Japan, vol. 4, No. 116 (M–027), Aug. 19, 1980 (JP–A–55 075 586, Jun. 6, 1980).

*Primary Examiner*—Edgar S. Burr
*Assistant Examiner*—Steven S. Kelley
*Attorney, Agent, or Firm*—Sughrue, Mion, Zinn, Macpeak & Seas, PLLC

[57] ABSTRACT

A controller for a serial printer carriage in a serial printer for printing characters line by line with an interval at the end of each line by moving a carriage with a motor, the controller comprises: an interval timer for setting an interval between the termination of printing one line and the commencement of printing the next line by the motor; a motor driver for starting supplying a driving current to the motor so as to print characters of one line at the timing determined by the output of the interval timer; an energy measuring unit for measuring the energy consumed by the motor per unit time; a limitation-value limiter for setting the limitation value of energy consumption by the motor per unit time; comparator for comparing the measured value of the consumed energy from the energy measuring unit with the limitation value of energy consumption; and interval adjuster for generating a time setting signal for extending the interval set by the interval timer when the comparison made by the comparator indicates that the consumed energy has reached the limitation value, and shortening the interval when the consumed energy has not reached the limitation value.

1 Claim, 7 Drawing Sheets

| POINTER C | Δtwm (msec) | Δtwp (msec) |
|---|---|---|
| 1 | 100 | 100 |
| 2 | 50 | 50 |
| 3 | 40 | 40 |
| 4 | 30 | 30 |
| 5 | 20 | 20 |
| 6 | 10 | 10 |
| 7 | 5 | 5 |
| 8 | 5 | 5 |
| 9 | 5 | 5 |
| 10 | 5 | 5 |

CONTROLLER FOR SERIAL PRINTER CARRIAGE

BACKGROUND OF THE INVENTION

The present invention relates to a serial printer carriage control, and more particularly to an apparatus for controlling the operation of a driving motor so as to maximize the throughput of a serial printer.

Figure 6:
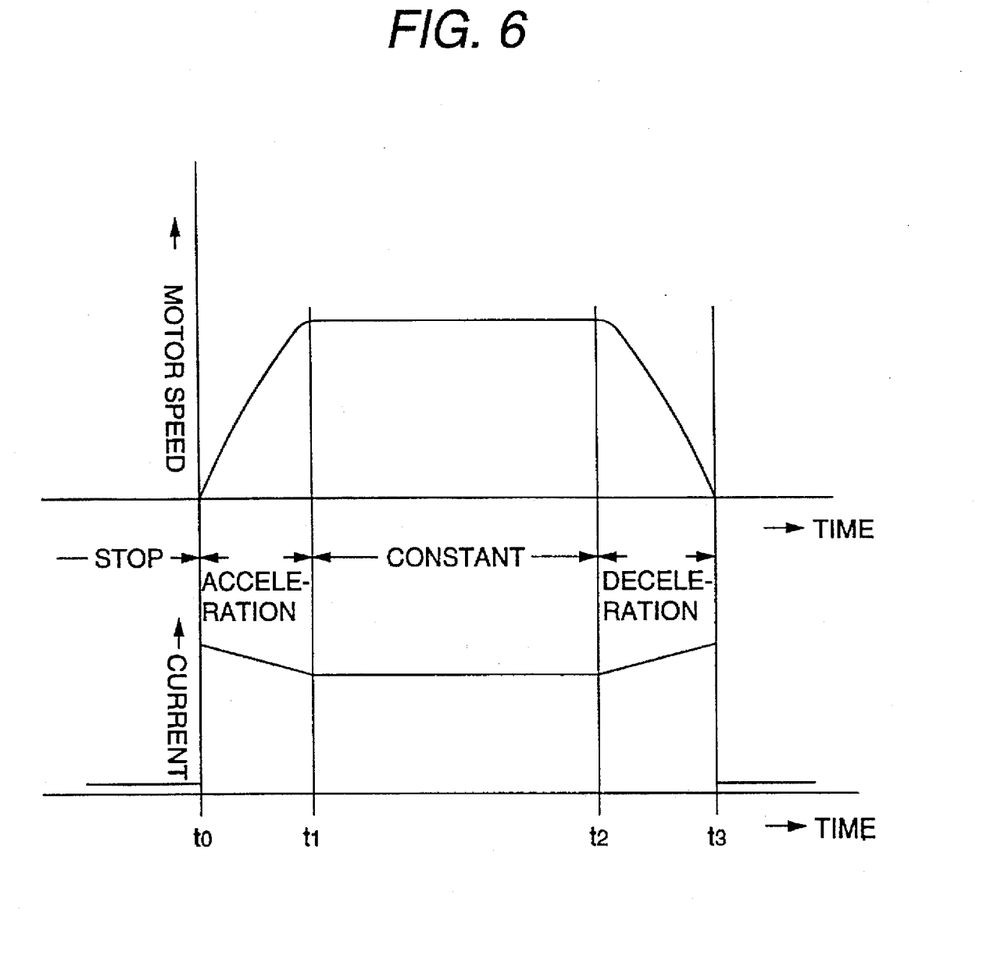
FIG. 6 is a chart showing the relation between the speed profile of the carriage motor and the driving current.

Heretofore, it has been often the case that serial printer carriages are driven by stepping motors. As shown in FIG. 6, the stepping motor is accelerated, operated at constant speed and decelerated with the carriage being driven, and an electric current whose value corresponds to the three stages above is supplied to the motor. More specifically, the current which sharply rises is applied to accelerate the motor at a point of time t0; a constant current is applied at t1 where the constant-speed operation starts; and when the decelerating operation starts at t2, the current value is increased and then the current sharply falls at t3. Although an interval follows after the point of time t3, a very small current is kept flowing through the motor to prevent position shifting. When power is supplied to the motor like this, the motor generates heat, thus causing a temperature rise, and an excessive temperature rise may shorten its life.

As the task of maximizing the throughput has been set to the printer, it is essential to maximize the operating time and to minimize the interval.

In view of the foregoing problems, electric power will have to be supplied so as to prevent the temperature of the stepping motor from excessively rising by suppressing the temperature properly to stably operate the motor for a long span of life.

For the reason stated above, an arrangement proposed in Japanese Unexamined Patent Publication No. 7580/1987 is to delay the starting of a stepping motor in proportion to the level of the motor-driving voltage detected.

With the arrangement above, however, the driving current value and the driving time as critical factors relevant to the rise in the temperature of the motor are not intended as objects to be controlled. In other words, allowance is to be made for such delay time more than necessary in order to sufficiently suppress the rise in the temperature of the motor only by the driving voltage. This results in delaying the average speed of the carriage-driving motor and it is therefore impossible to maximize the throughput of the printer.

In order to monitor the temperature rise itself, on the other hand, the provision of a built-in temperature sensor may be considered. However, it will still incur an additional cost to provide such a temperature sensor and a cost increase is what should be avoided.

SUMMARY OF THE INVENTION

In consideration of the foregoing questions, an object of the present invention is to provide an apparatus for controlling a carriage-driving motor so as to maximize the throughput of a printer by monitoring the rise in the temperature of the motor without placing a temperature sensor in the motor.

In order to accomplish the object above, according to a first aspect of the present invention, there is provided a carriage control for a serial printer for printing characters line by line with an interval at the end of each line by moving a carriage with a motor comprising: an interval timer for setting an interval between the termination of printing one line and the commencement of printing the next line by means of the motor, motor driving means for starting supplying a driving current to the motor so as to print characters of one line at the timing determined by the output of the interval timer, energy measuring means for measuring the energy consumed by the motor per unit time, limitation-value setting means for setting the limitation value of energy consumption by the motor per unit time, comparing means for comparing the measured value of the consumed energy from the energy measuring means with the limitation value of energy consumption, and interval adjusting means for generating a time setting signal for extending the interval set by the interval timer when the comparison made by the comparing means indicates that the consumed energy has reached the limitation value, and shortening the interval when the consumed energy has not reached the limitation value.

According to a second aspect, there is provided the carriage control described above further comprising a comparison frequency timer for giving the comparing means a timing signal at predetermined intervals to make the comparing means carry out the comparison at the predetermined intervals.

According to a third aspect, there is provided the carriage control of the second aspect is arranged so that the total consumed energy of the motor during a predetermined time is sequentially measured and updated, and that the consumed energy thus updated per unit time is compared with the limitation value of energy consumption.

According to a fourth aspect, there is a provided the carriage control of the first aspect is arranged so that when the interval adjusting means for continuously extending or shortening the interval, it forms the time setting signal in accordance with the number of times the interval is continuously extended or shortened.

In the apparatus according to the first aspect, the carriage-driving motor prints one line of characters after the next line of them with an interval therebetween. The motor driving means operates to drive the motor by supplying power thereto on receiving the output of the interval timer after the lapse of the interval. The energy consumed during the operation of the motor is measured by the energy measuring means as energy per unit time and compared with the limitation value set by the limitation value setting means. The result of comparison is given to the interval adjusting means and, when the consumed energy has reached the limitation value, the interval adjusting means extends the interval or otherwise shortens the interval when the energy has not reached the limitation value yet. Thus the carriage-driving motor is always operated at a level extremely close to its temperature-rise limitation value.

In the apparatus according to the second aspect, the rise in the temperature of the motor is continuously monitored with the period set by the comparison frequency timer to adjust the interval.

In the apparatus according to the third aspect, the total consumed energy of the motor during the period is sequentially measured by the comparison frequency timer and updated, whereby the updated consumed energy data is used in comparison with the limitation value to control the motor.

In the apparatus according to the fourth aspect, the variation of the interval is gradually decreased when the interval adjuster means continuously extends or shortens the interval, so that the temperature rise limitation value of the carriage-driving motor is subjected to critical braking.

In the apparatus according to the first aspect, the energy consumed by the motor per unit time is compared with the limitation value, and the interval is extended when the consumed energy has exceeded the limitation value and shortened when it has not reached the limitation value, whereby the motor can be operated so as to drive the carriage to the utmost within the range of not damaging the motor. Consequently, the carriage can be operated so as to maximize the throughput of the printer.

In the apparatus according to the second aspect, the interval is made properly adjustable by monitoring the rise in the temperature of the motor with the period determined by the comparison frequency timer. The carriage is thus driven without excessively changing the interval to maximize the throughput of the printer.

In the apparatus according to the third aspect, the total consumed energy of the motor during the period determined by the comparison frequency timer is sequentially updated, whereby the driving of the carriage is made always controllable in accordance with the data thus updated without being affected by any sudden change.

In the apparatus according to the fourth aspect, the throughput of the printer can be prevented from being suddenly changed since the variation of the interval is gradually decreased when the interval is continuously extended or shortened to subject the temperature-rise limitation value of the carriage-driving motor to critical braking.

DETAILED DESCRIPTION OF THE PREFERRED EMBODIMENTS

Figure 1:
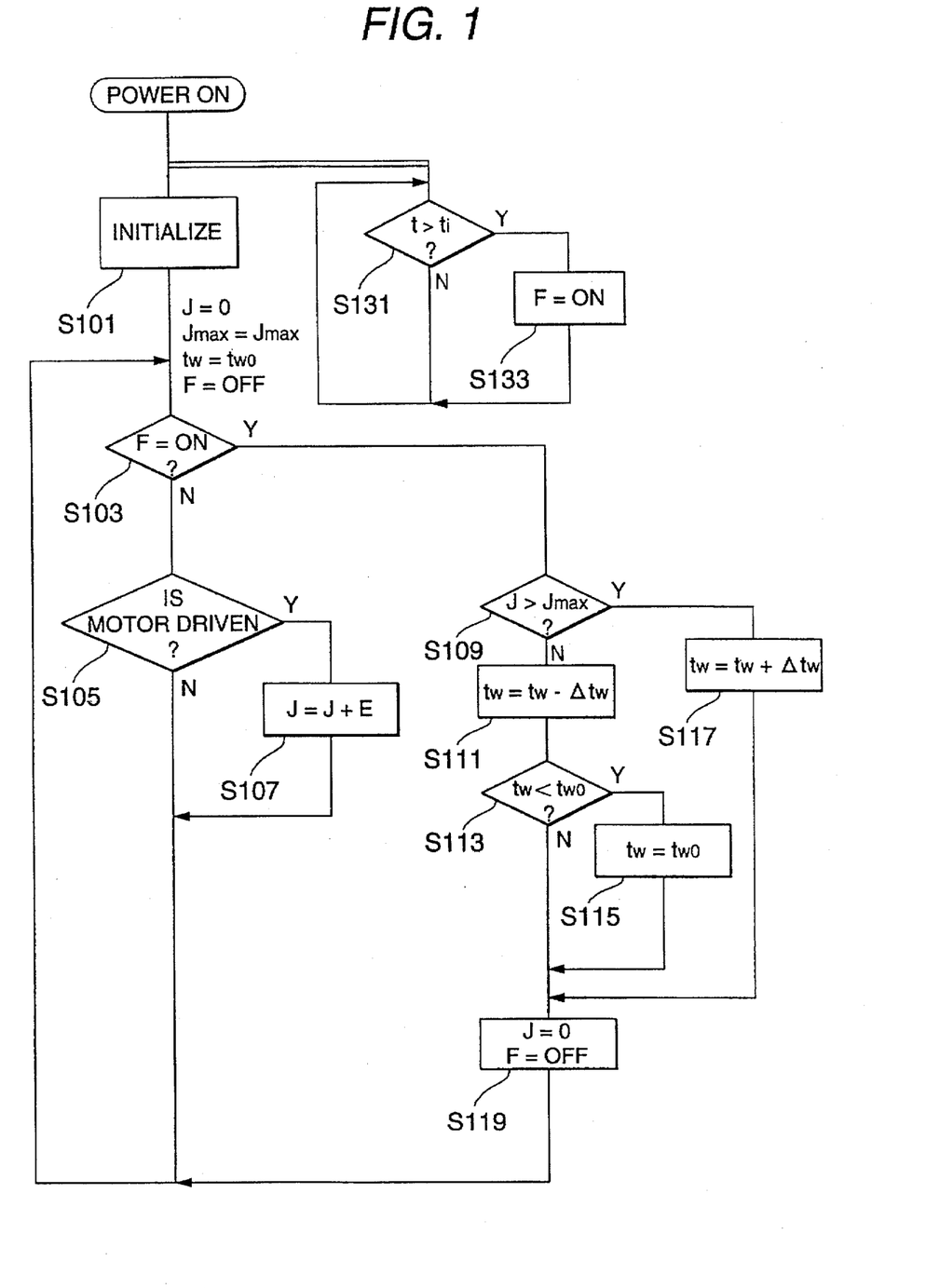
FIG. 1 is a flowchart showing the operation of a first embodiment of the invention.

FIG. 1 is a flowchart showing the operations of a first serial printer carriage control embodying the present invention. In this practice of the invention, initialization is effected at Step S101 when the power supply is turned on. More specifically, the following is effected: J=0, that is, the measured value of the consumed energy is erased; Jmax= Jmax, that is, the limitation value Jmax of energy consumption is set; tw=tw0, that is, a minimum interval is secured; F=OFF, that is, a comparison operating flag is reset; and an interval timer is started, the interval timer holding F=ON, that is, a flag is set with every period ti through parallel processing at Steps S131 and S133.

At Step S103, a decision is made on whether or not a flag has been set as a result of periodic flag setting. When no flag has been set, a decision is made on whether or not the motor has been operated at Step S105. When the motor has already been operated, the energy E consumed by the motor during its operation is sequentially added to a measured consumed energy value J at Step S107. This process is repeated until a flag is set to measure the energy consumed within the period of ti.

When the period ti has lapsed, that is, when the flag is decided to be up at Step S103, the measured consumed energy value J during the present period ti is compared with the limitation value Jmax of energy consumption to examine the relation therebetween at Step S109. When the measured consumed energy value J has exceeded the limitation value Jmax and when the temperature of the motor is judged to be within the allowable value limit, the interval tw is extended to (tw+Δtw) to restrain the rise in the temperature of the motor at Step S117. When the measured consumed energy value J has not reached Jmax, the interval is shortened to (tw−Δtw) to control the motor so that it is operated with high efficiency at Step S111. In this case, the Δtw at the time the interval is extended and shortened may be varied from each other.

The length of the interval is examined at Step S113 and when it becomes shorter than the minimum interval tw0, it is restored to tw0 at Step S115 to make the value limit take hold. Then J=0 so that energy consumption is finally measured during the next period ti, together with F=OFF, that is, the flag is reset to return the flow to Step S103.

The energy consumed by the carriage-driving motor is obtained by measuring the value of the power supplied thereto, and the value of the power thus obtained is compared with the limitation value. The result of the comparison is utilized to shorten or extend the interval after the carriage-driving motor is operated to print characters of one line. The carriage-driving motor is thus driven up to the limit of its capacity so as to maximize the throughput of the printer.

Figure 2:
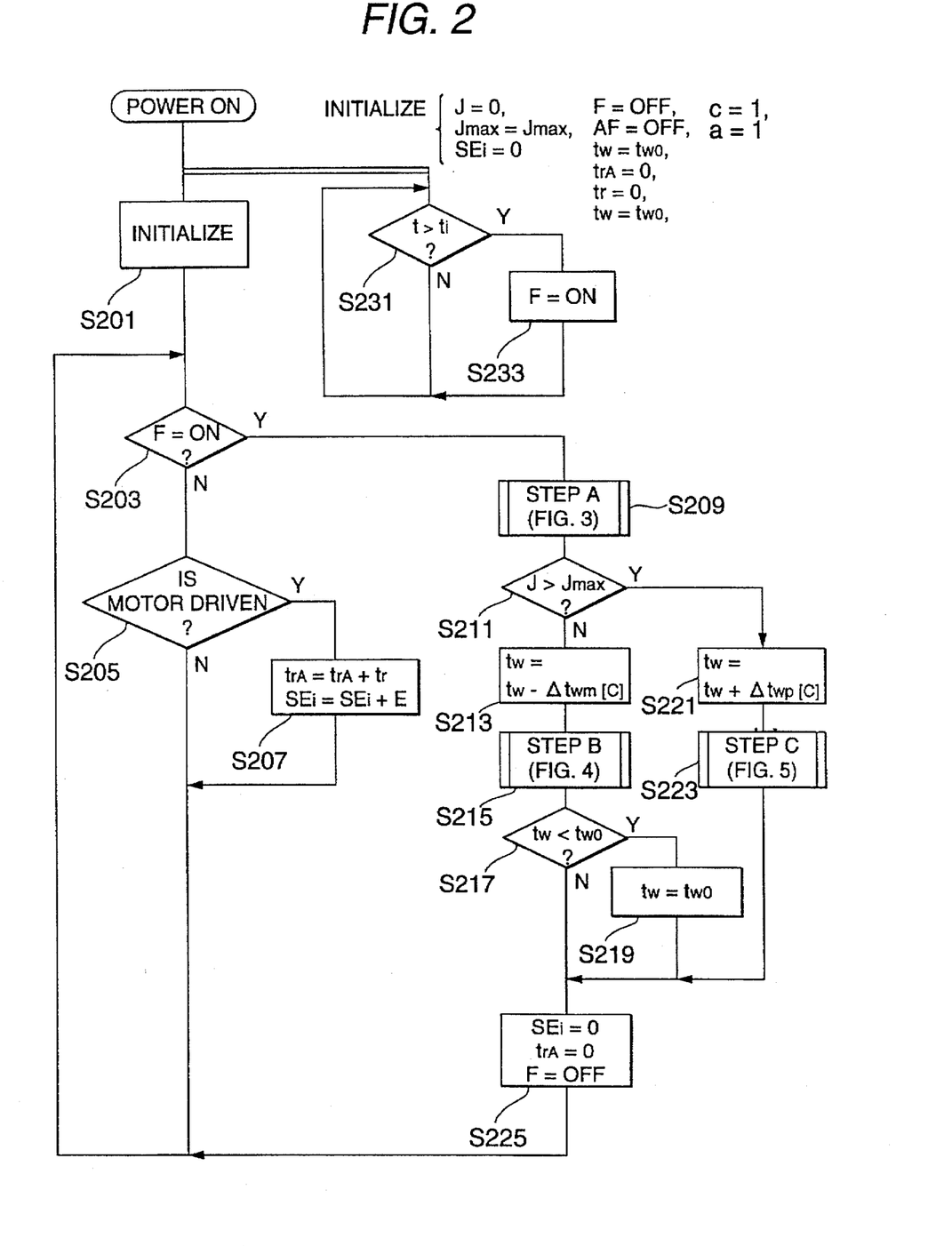
FIG. 2 is a flowchart showing the operation of a second embodiment of the invention.
Figure 3:
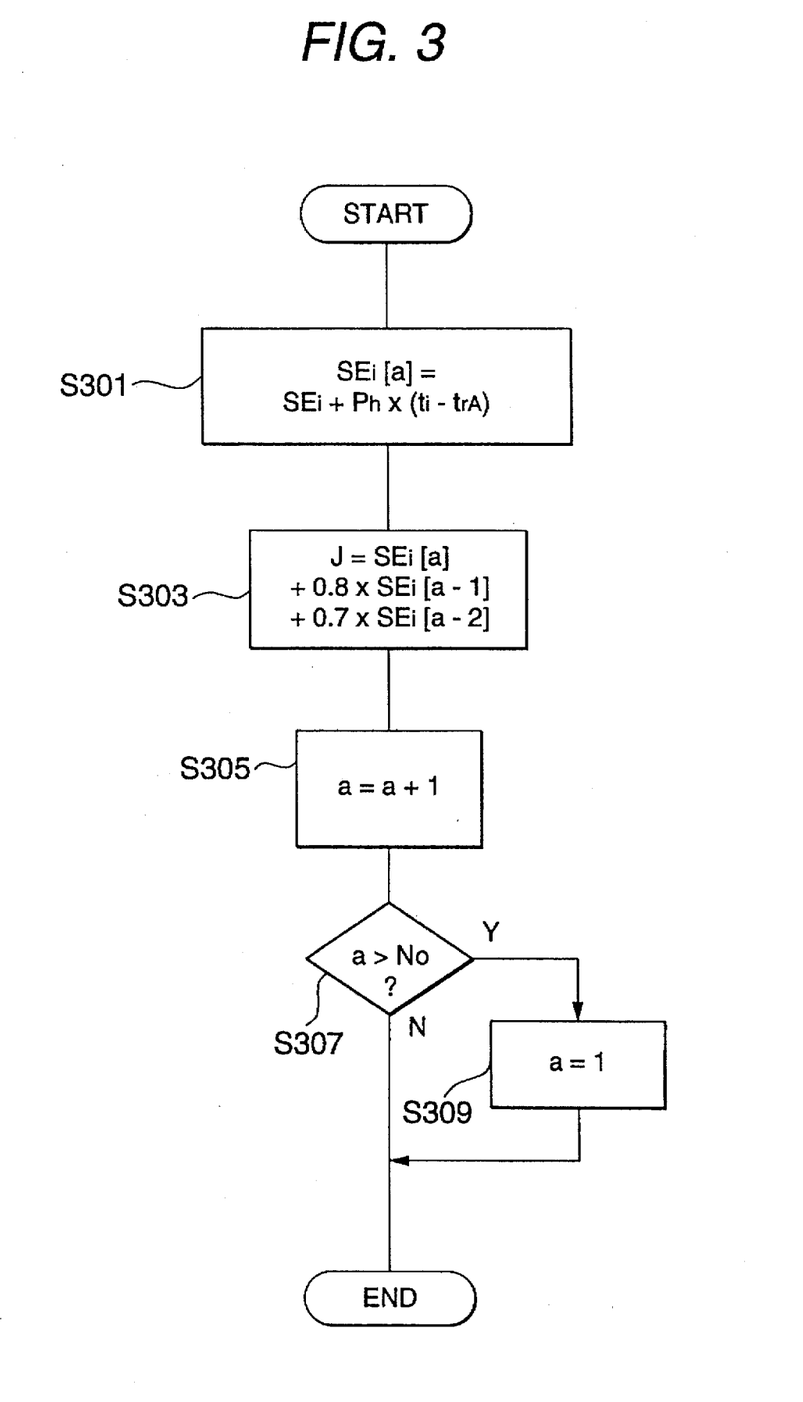
FIG. 3 is a flowchart showing in detail Step S211 of FIG. 2 at Steps S301 through S313.
Figure 4:
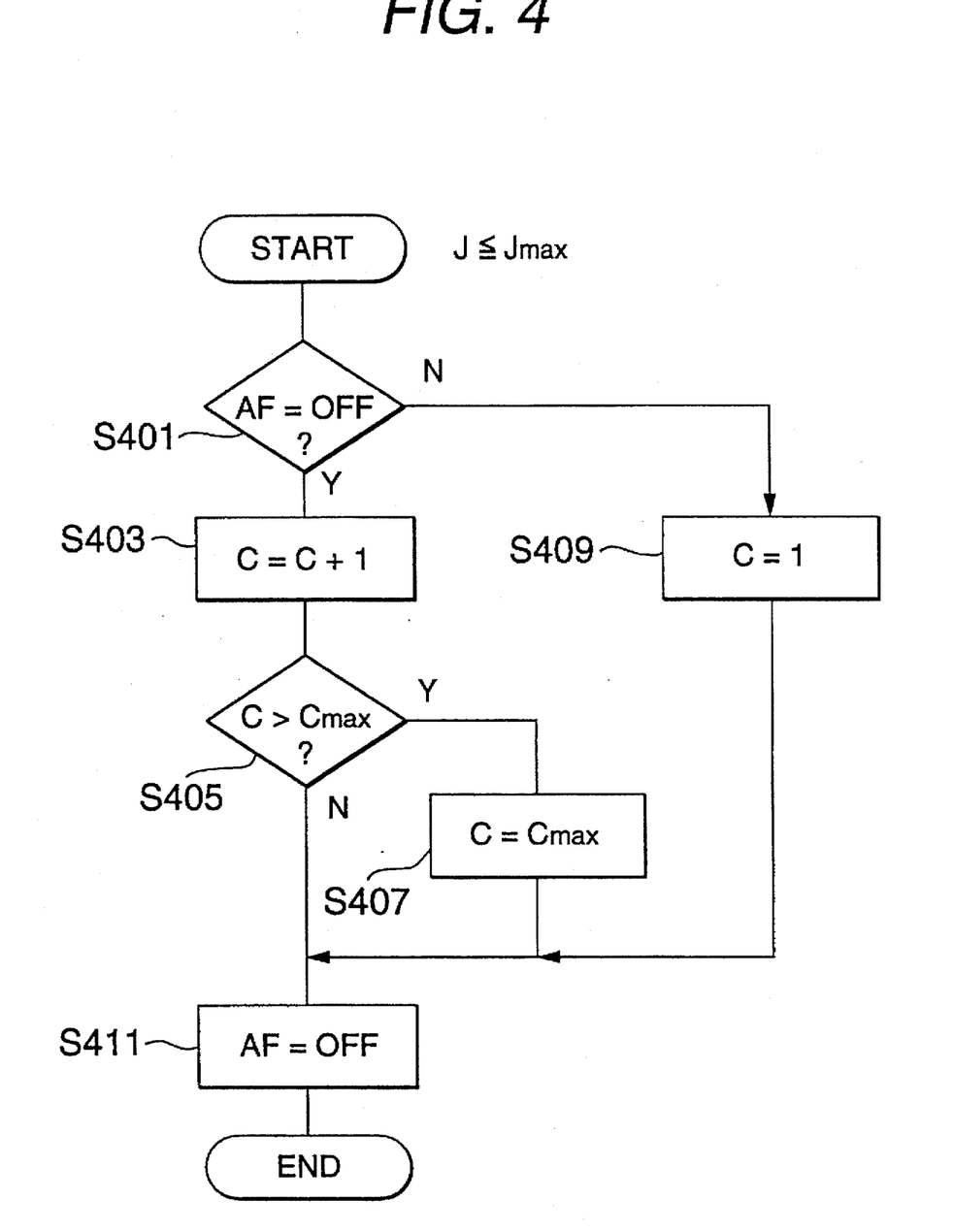
FIG. 4 is a flowchart showing in detail Step B of FIG. 2.
Figure 5:
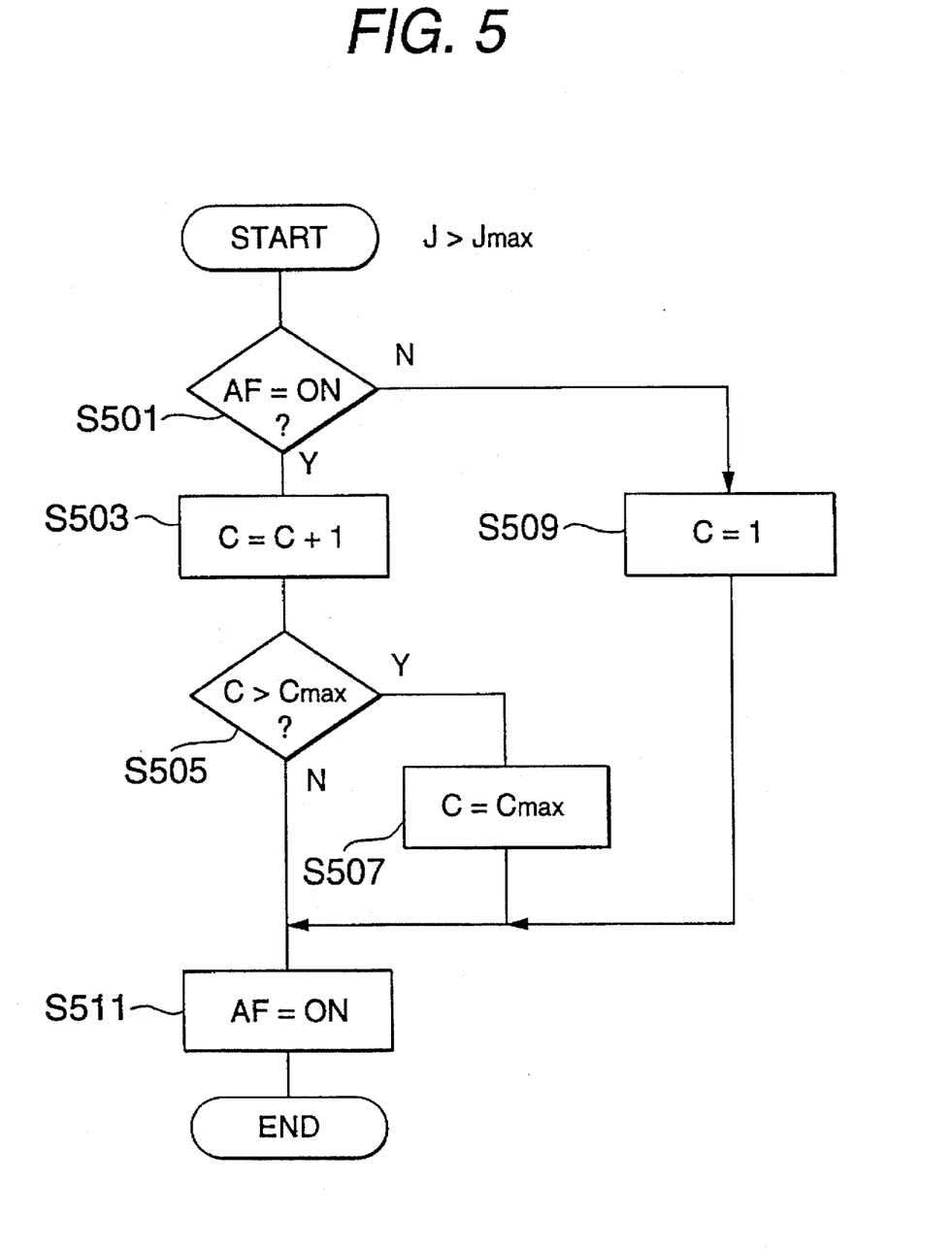
FIG. 5 is a flowchart showing in detail Step C of FIG. 2.

FIG. 2 is a flowchart showing the operations of a second serial printer carriage control embodying the present invention. In comparison with what is shown in FIG. 1, this flowchart features inclusion of Step A shown by Step S209, Step B shown by Step S215, and Step C shown by Step S223. Further, detailed illustrations of Step A, Step B and Step C are each given in FIGS. 3 to 5. Referring to FIGS. 3 to 5 in addition to FIG. 2, a description will subsequently be given of the present embodiment of the invention.

This practice of the invention is featured in that, in consideration of the accumulation and radiation of heat, the driving energies SEi during the past several periods ti are weighed one against another before being added to provide the measured consumed energy value J.

First, various initializing operations are performed at Step S201 when the power supply is turned on. More specifically, the following is effected: J=0, that is, the measured value of the consumed energy is erased; Jmax=Jmax, that is, the limitation value Jmax of energy consumption is set; tw=tw0, that is, a minimum interval is secured; F=OFF, that is, a comparison operating flag is reset; and an interval timer is started, the interval timer holding F=ON, that is, a flag is set with every period ti through parallel processing at Steps S231 and S233.

At Step S203, a decision is made on whether or not a flag has been set as a result of periodic flag setting. When no flag has been set, a decision is made on whether or not the motor has been operated at Step S205. When the motor has already been operated, driving time tr covering the driving of the carriage motor once starting with the forward rush up to the termination of the backward rush is added to the total trA of the driving time of the carriage motor during the period ti so as to update the trA. Moreover, the driving energy E covering the driving of the carriage motor once starting with the forward rush up to the termination of the backward rush is added to the consumed energy SEi during the period ti. This process is repeated until a flag is set to measure the driving time trA and the energy SEi consumed within the period of ti.

When the period ti has lapsed, that is, when a decision has been made on the fact that the flag is up at Step S203, Step S209, that is, the operation of Step A is performed as shown in FIG. 3.

Referring to Steps S301 through S313 of FIG. 3, a detailed description will be given of Step S209. At Step S301, retention energy for preventing position shifting, that is, Ph×(ti−trA) which is supplied even during the time the operation of the carriage motor is suspended to obtain the accurate consumed energy within the present period ti, is added so as to make a correction resulting in consumed energy SEi within the present period ti, SEi being stored at a memory address indicated by a pointer a.

At Step S303 subsequently, the value obtained at Step S301, and the energies consumed several times within the period ti in the past and weighed one against another, are accumulated to obtain the latest measured value J of energy. The operation of weighing the consumed energies is performed by multiplying the latest measured value of energy by 100 (%), one preceding measured value by 80 (%), and a further preceding measured value by 70 (%).

In other words, the consumed energy J comes up to the sum of the latest SEi [a]+0.8×SEi [a−1] and 0.7×SEi [a−2], the latter two consumed energies being obtained several times (twice in the past according to the present invention) as in the case of the latest SEi [a] and stored in a shift register.

The pointer a indicating the memory address of the latest measured value is updated at Steps S305 through S309 as the shift register is formed in a software mode in this practice of the invention.

The consumed energy thus obtained is used to perform the operations at and after Step S211 of FIG.

At Step S211, a decision is made on whether the consumed energy J has exceeded the limitation value Jmax of energy consumption and when the former has not exceeded the latter yet (J≦Jmax), the interval tw is shortened at Step S213. In other words, by reference to a table of intervals correspondingly stored in keeping with a pointer C as will be described below, a process of tw=tw−Δtwm [C] is performed and then the operation of Step B of FIG. 4 is performed at Step S215.

Referring to FIG. 4, a detailed description will be given of Step B. At Step S401, a decision is made on the setting of a flag AF for storing an increase or decrease in the interval tw at the preceding process step, and the pointer C is revised.

When AF=OFF is decided at Step S401, that is, when the consumed energy J has not exceeded the limitation value Jmax of energy consumption yet on the preceding decision thus made and when the interval tw has been shortened, the pointer C is incremented by one at Step S403, and a decision is made on whether the pointer C updated at Step S405 exceeds the maximum value. When the pointer C exceeds the maximum value, it is adjusted to the maximum value at Step S407.

When AF=OFF is not decided at Step S401, that is, when the consumed energy J has exceeded the limitation value Jmax of energy consumption and when the interval tw has been extended, the pointer C is restored to 1 at Step S409.

At Step S411, the relation between the consumed energy J this time and the limitation value Jmax of energy consumption is stored as AF=OFF, and the flow is returned to Step S217.

At Steps S217 through S219, the interval tw obtained at Step S213 is so regulated that it is kept from being shorter than the minimum interval tw0. When the interval tw becomes shorter than the minimum interval tw0, the interval tw is reset to the minimum interval tw0 at Step S219, and the flow is moved to Step S225.

When it is decided that the consumed energy J has exceeded the limitation value Jmax of energy consumption (J>Jmax) at Step S211, the interval tw is extended at Step S221. In other words, by reference to the table of intervals stored in keeping with the pointer C as will be described below, a process of tw=tw−Δtwp [C] is performed and then the operation of Step C of FIG. 5 is performed at Step S223.

Referring to FIG. 5, a detailed description will be given of Step C. At Step S501, a decision is made on the setting of a flag AF for storing an increase or decrease in the interval tw at the preceding process step, and the pointer C is revised.

When AF=ON is decided at Step S501, that is, when the consumed energy J has exceeded the limitation value Jmax of energy consumption on the preceding decision thus made and when the interval tw has been extended, the pointer C is incremented by one at Step S503, and a decision is made on whether the pointer C updated at Step S505 exceeds the maximum value. When the pointer C exceeds the maximum value, it is adjusted to the maximum value at Step S507.

When AF=ON is not decided at Step S501, that is, when the consumed energy J has not exceeded the limitation value Jmax of energy consumption yet and when the interval tw has been shortened, the pointer C is restored to 1 at Step S509.

At Step S511, the relation between the consumed energy J this time and the limitation value Jmax of energy consumption is stored as AF=ON, and the flow is returned to Step S225.

At Step S225, SEi=0, trA=0, and F=OFF, that is, the flag is reset to measure energy consumption during the next period ti, and the flow is returned to Step S203. Then the aforementioned process is repeated.

Figure 7:
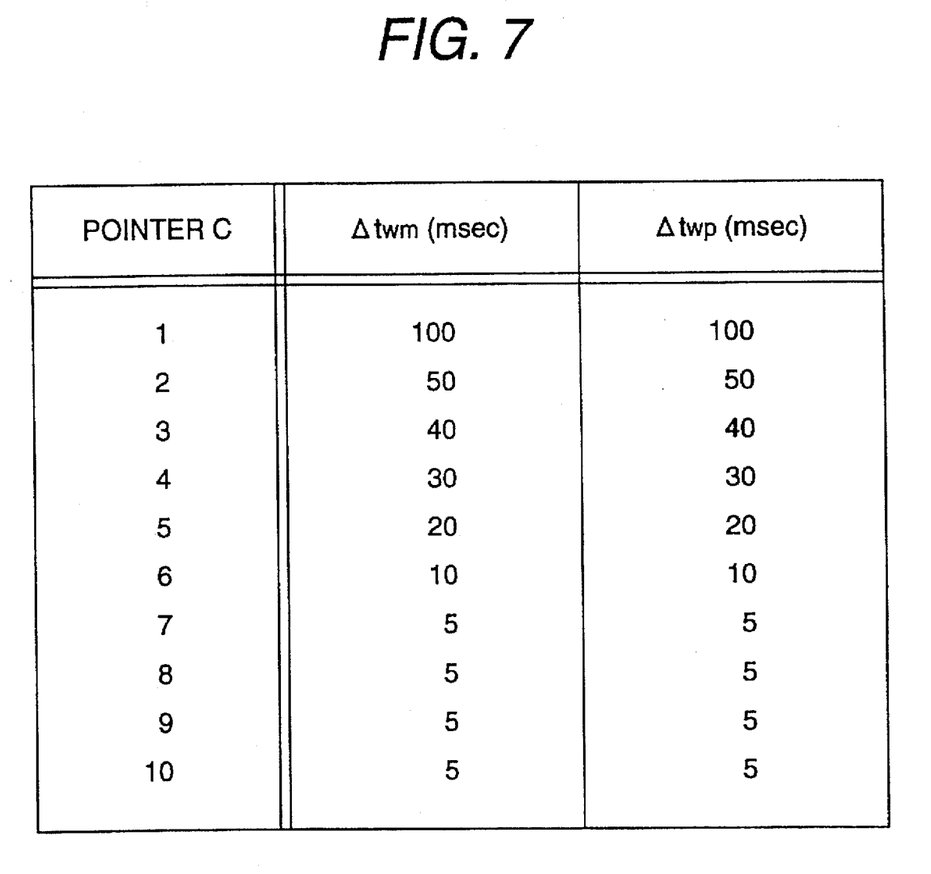
FIG. 7 is a table of intervals for use in the second embodiment of the invention.

FIG. 7 is the aforementioned actual table of intervals. As shown in FIG. 7, the shortening time Δtwm and the extending time Δtwp have been set so as to decrease as the pointer increases. In other words, the pointer C is kept increasing as long as the result of the decision made on the relation between the consumed energy J and the limitation value Jmax of energy consumption is continuously kept with J≦Jmax. In this case, however, gradually increasing or decreasing the shortening time Δtwm is used to effectively subject the heat-generation limitation value to critical braking. Although the pointer C is kept increasing as long as the result of the decision made on the relation between the consumed energy J and the limitation value Jmax of energy consumption is continuously kept with J>Jmax likewise, gradually increasing or decreasing the extending time Δtwp is used to effectively subject the heat-generation limitation value to critical braking in even this case.

While the heat generated from the carriage-driving motor is restrained to a degree as low as possible by increasing or decreasing the interval in conformity with a variation in the consumed energy of the carriage motor, the carriage motor is operated with maximum efficiency so as to maximize the throughput of the printer.

What is claimed is:

1. In a serial printer, a method for controlling a temperature of a motor that drives a print carriage, said method comprising the steps of:

setting an delay time interval, an extending time value, a shortening time value, and a consumed energy limitation value;

measuring an amount of energy consumed by said motor over a unit of time to provide a measured energy value;

making a comparison between said measured energy value and said consumed energy limitation value;

increasing said delay time interval by said extending time when said comparison indicates that said measured energy value is greater than said consumed energy limitation value; and decreasing said delay time interval by said shortening time when said comparison indicates said measured energy value is less than said consumed energy limitation value.

* * * * *